Figure 1:
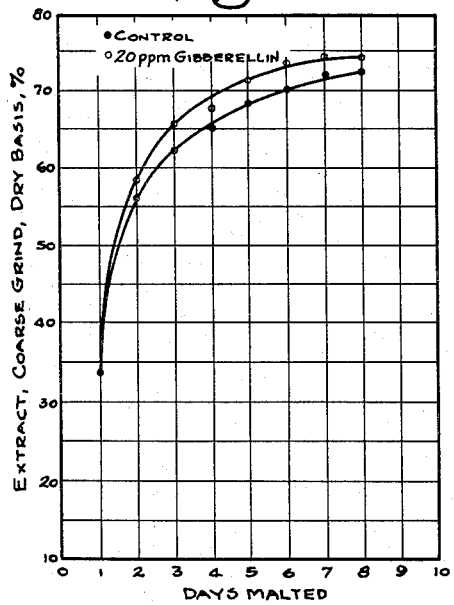

INVENTORS
MICHAEL R. SFAT
ROBERT H. BAUKNECHT
RICHARD F. BAWDEN
ROBERT V. DAHLSTROM

Wheeler, Wheeler + Wheeler
ATTORNEYS

Dec. 31, 1963   M. R. SFAT ETAL   3,116,221
GRAIN MALTING METHOD AND PRODUCT
Original Filed June 22, 1959   2 Sheets-Sheet 2
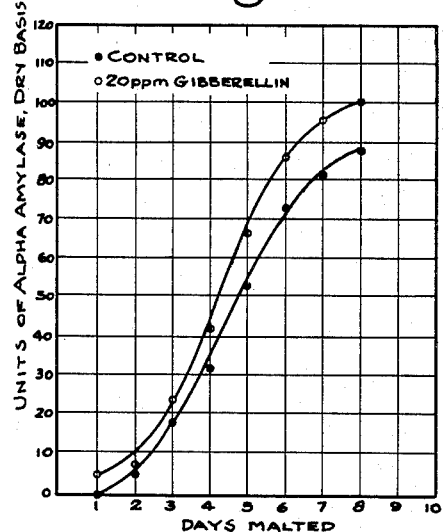
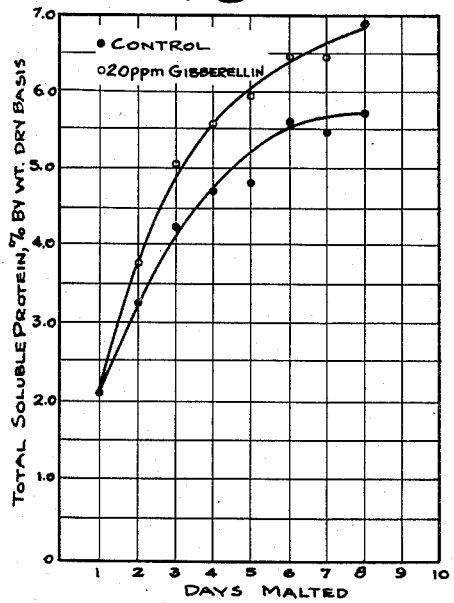
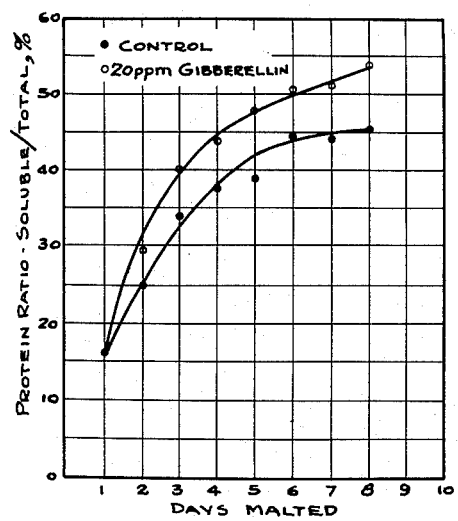
INVENTORS
MICHAEL R. SFAT
ROBERT H. BAUKNECHT
RICHARD F. BAWDEN
ROBERT V. DAHLSTROM
Wheeler, Wheeler & Wheeler
ATTORNEYS 3,116,221
GRAIN MALTING METHOD AND PRODUCT
Michael R. Sfat, Manitowoc, Robert H. Bauknecht, Two Rivers, and Richard F. Bawden and Robert V. Dahlstrom, Manitowoc, Wis., assignors to Rahr Malting Co., Manitowoc, Wis., a corporation of Wisconsin
Continuation of application Ser. No. 821,766, June 22, 1959. This application Mar. 16, 1962, Ser. No. 181,838
11 Claims. (Cl. 195—70)

This invention relates to improvements in malt and the process of malting grain, particularly for use in making beverages and foods for consumption by human beings and animals, as well as use for other industrial purposes.

Although various cereals are malted for food, feed and industrial purposes, barley is the grain most often used. Even when barley for malting is selected from well cleaned lots of the best varieties known and comprises barley apparently having good malting potential, the grain in each lot varies considerably in its malting qualities. Malting processes are therefore a compromise to achieve satisfactory treatment of grain to produce malt having different properties as users specify for making different final products.

Maltsters desire to process barley as rapidly as possible to provide the highest yield of extract consistent with other requirements and, at the same time, to develop the desired enzymes and other compounds in forms and in amounts equal to or better than the minimum values acceptable to brewers, distillers and other users. Any change which reduces the time required for the malting process consistent with meeting buyers' specifications for malt, increases the capacity of available equipment and thereby reduces cost of the finished malt.

Further, any change in the malting process which improve total extract obtainable and the efficiency of extraction of solubles from the malted grain or increases the amount of certain enzymes present, and particularly the amylase content, is beneficial to maltsters and users of malt. In a season in which growth conditions or harvesting conditions have been below normal, most of the barley grown is of lower quality so that at such times, maltsters have not heretofore obtained the optimum yield and enzyme development and modification of other compounds in the grain have not heretofore been brought to the desired values. Even under such conditions, with our improved process we have been able to secure satisfactory yield of extract, quantity of amylases and proteases and the cytolytic enzymes, ratio of soluble proteins to total protein, and have been able to modify the malt to meet the requirements of different users.

By variation of usual malting process conditions as to water content, temperature and time, and the addition of certain gibberellins such as gibberellic acid (also known as gibberellin X and gibberellin $A_3$) and their respective alkaline earth salts pursuant to a particular technique and at a particular time in the malting process, we have been able to increase the rate of development and growth in the malting process. Likewise, we have been able to increase the yield of extract and the efficiency of extraction and to increase the levels of the several enzymes and other materials available to users. Hence, it is now possible and practicable to use lower grades of barley and varieties of barley not previously acceptable, to shorten the malting time and increase the output from given equipment and manpower and to increase the yield of extract and the efficiency of extraction, and to assure and practically guarantee satisfactory amounts of the amylases as well as to increase the amounts of other enzymes and other materials present in the malt.

Figure 2:
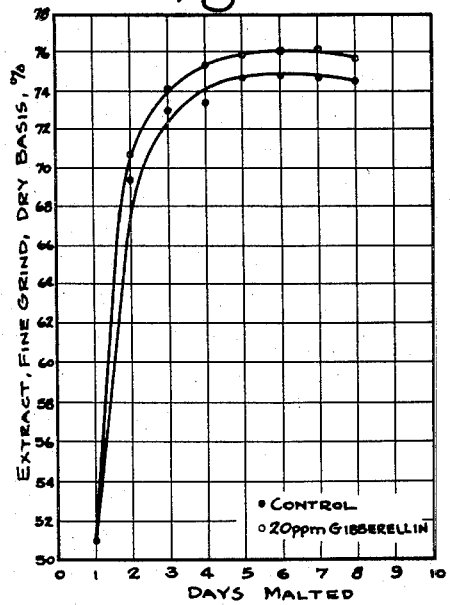
Figure 3:
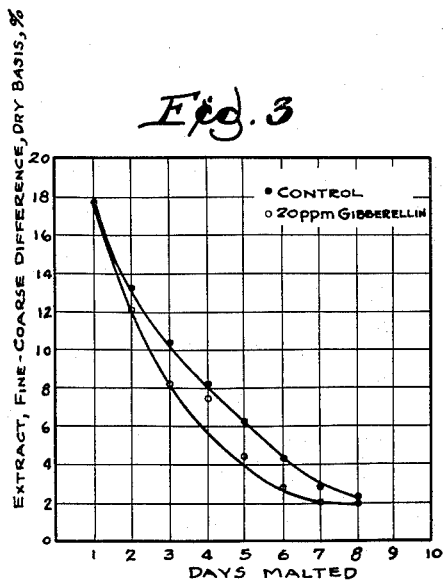
Figure 4:
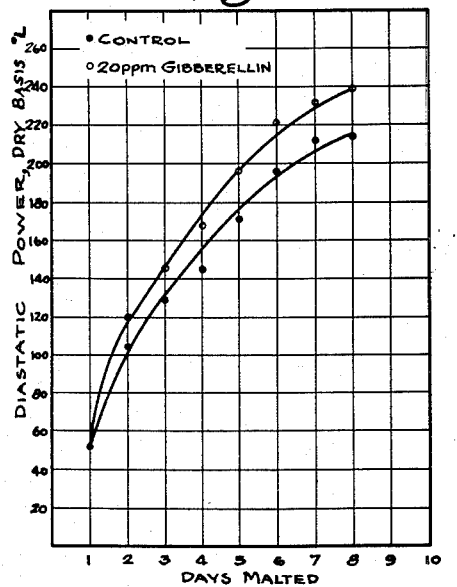

In the drawings:

FIG. 1 shows curves comparing the percentage of coarse grind extract obtained from a number of samples of malt from the same lots of barley and produced with and without gibberellin and shows increase in both the rate of change and the total amount of extract obtained in the samples treated with gibberellin;

FIG. 2 gives curves showing an increase in both rate of change and total amount of extract upon fine grinding, from batches of barley taken from the same lots and which were malted at the same time by our improved process using a gibberellin and by a usual process without use of gibberellin;

FIG. 3 gives curves showing the smaller fine-coarse grind difference in extract for such batches of malt, the difference being a measure of permeability of the endosperm, and the lower difference values obtained by our improved process showing that the total extract is more easily and efficiently obtained;

FIG. 4 compare the diastatic power obtained by our improved process and a usual process, diastatic power being a measure of the ability of one gram of the malt to convert starches into fermentable sugars;

FIG. 5 compares the alpha amylase content of the malts made by our improved process and a usual process, such amylase being the enzyme per gram of malt required for splitting starch into lower molecular weight dextrins;

FIG. 6 gives curves showing the percentage of total soluble protein produced and shows increase in both the rate of production and the total amount of soluble protein obtained by our improved process as compared to the usual process; and FIG. 7 shows the protein ratio of the batches of malt used in determining the values shown herein, the ratio of soluble protein to total protein being a measure of the enzymatic changes during malting due to the proteolytic enzymes produced and showing greater proteolytic activity in malt made by our improved process.

In our process for making distillers' (high enzyme) malt, the barley is steeped in water for 10 hours at 52° F. or for such other combinations of time and water temperature as will result in moisture content of 33–37% of the "wet" weight of the grain. We find the optimum water content to be 34–36% in processing distillers malt. The barley is then couched for 12–40 hours and transferred to containers or compartments for germination and is leveled to provide beds of substantially uniform depths.

A water solution of a gibberellin or an alkaline earth salt thereof is now applied to the barley beds in a fine spray to distribute throughout such beds, while they are being turned, 25–20,000 micrograms of gibberellin per pound of barley as received from storage, the water content of the barley then being increased by approximately 2%. The barley is now kept at approximately 55–65° F. for 12–48 hours to assure assimilation of the gibberellin solution. We have found that the desired effects are produced at various concentrations of gibberellin as shown by Table I below.

TABLE I

*Effect of Gibberellin Concentration*

| Gibberellin Sol. Conc., p.p.m. | 0 | 10 | 20 | 30 | 40 | 50 | 100 |
|---|---|---|---|---|---|---|---|
| Fine Grind Ext. dry basis, percent | 74.3 | 75.2 | 75.7 | 75.4 | 75.7 | 75.7 | 75.5 |
| Coarse Grind Ext. dry basis, percent | 71.6 | 72.5 | 73.1 | 73.3 | 73.3 | 73.7 | 73.7 |
| Fine-Coarse Grind Difference, percent | 2.7 | 2.7 | 2.6 | 2.1 | 2.4 | 2.0 | 1.8 |
| Diastatic Power, dry basis, units | 219 | 226 | 236 | 242 | 242 | 248 | 246 |
| Alpha Amylase, dry basis, units | 76.1 | 84.4 | 90.4 | 90.8 | 97.1 | 101.3 | 100 |
| Soluble Protein: Total Protein, percent | 45.2 | 48.6 | 51.3 | 53.0 | 52.8 | 53.6 | 54.2 |
| Soluble Protein, percent by Wt., dry basis | 5.77 | 6.28 | 6.54 | 6.64 | 6.79 | 6.87 | 6.98 |

It will be seen from the above table that all of the desired values are substantially improved as compared to malt made by a usual process. Although, as can be seen from the table, higher concentrations continue to produce an improved product, a range of 10 to 50 p.p.m. was selected as an economic optimum since higher concentrations do not produce proportionately higher response.

The barley is now watered at intervals to keep the water content at 50–53% of the "wet" weight of the grain until sufficient growth is obtained. During the above treatment the barley has germinated and is growing, and enzymes are being developed. The enzymes particularly desired are alpha and beta amylase, proteases and hemicelluases, alpha amylase producing dextrins from starch (dextrinizing or liquefying amylase) and beta amylase producing maltose from the starch (saccharifying amylase). Growth of the barley is allowed to continue until the alpha and the beta amylase content (diastatic power) have reached a given value dependent on the use to be made of the malt, at which time proteases and other enzymes will also have reached high values for a given malt.

After 4–7 days of germination at 55–65° F., the malt is dried and may be subjected to atmosphere containing sulfur dioxide to reduce the number of bacterial and molds present and produce some bleaching action. The malt is dried in a kiln until the water content of the malt is reduced to approximately 5–6%, at temperatures which do not affect the potential of the various enzymes in the malt and in such manner as to secure uniform drying.

The average analytical characteristics of malts made by our improved process as compared to a usual process, are shown in Table II for a substantial number of production batches.

TABLE II

|  | New Process | Usual Process |
|---|---|---|
| Extract, fine grind, dry basis, percent | 75.1 | 74.2 |
| Extract, coarse grind, dry basis, percent | 73.7 | 71.1 |
| Extract, fine-coarse difference, dry basis, percent | 1.4 | 2.2 |
| Soluble protein, percent by wt., dry basis | 7.5 | 6.4 |
| Diastatic power, dry basis, units | 250 | 215 |
| Alpha amylase, units, dry basis | 95 | 60 |
| Protein ratio, percent | 56 | 48 |
| Lasche test, minutes | 4¼ | 6 |

The Lasche test measures speed of conversion of starch with a given amount of malt extract. All other analytical methods are American Society of Brewing Chemists standard procedures, published 1958 (6th edition), as "Methods of Analysis of American Society of Brewery Chemists," on the following pages: extract, coarse grind, page 149; extract, fine grind, page 149; diastatic power, page 169; alpha amylase, page 169; soluble protein, page 173; protein ratio, page 173.

The items relating to grinding in the above data, as shown in the curves and tables, illustrate that our process produces both increase in yield of extract available to users and increased efficiency in obtaining the extract. The increased diastatic power shows that we obtain higher amounts of amylases of which the increased amounts of alpha amylase are particularly valuable to distillers as leading to higher sugar availability for production of alcohol. The ratio of soluble protein to total protein and the amounts of soluble protein are both increased due to increase in amount of proteolytic enzymes, the soluble protein being particularly important to most users as it is directly available for liquid products.

In making brewers' malt, the process is similar to that described in detail above excepting for the following differences: Brewers' malt is steeped to 42–46% moisture (wet basis) and we find that this can be accomplished with B grade barley in 38 hours at 58° F. We now prefer to germinate with aeration at 55–65° F. and we find that germination can be accomplished in 4–7 days. The watering required is less as we use a total of only 0.8 to 1.5 gallons per bushel of grain to reach a water content of 46–48%. The malt is dried to not over 4% moisture to realize the desired enzyme, color and flavor characteristics. We find that for a given brewing process, better extract is obtained as a result of our new process for manufacturing malt.

We have found that growth is faster and goes to completion in 24–48 hours less time with most barleys. Such saving of time substantially increases capacity of a given malting operation.

At the end of a given time the amount of alpha amylase present in the malt from a given barley is greater than the amount of such enzyme in a similar quantity of the same barley malted by other methods. Hence, it is apparent that a result of the present method is to promote the formation of amylases in excess of the amounts heretofore obtainable. The levels of alpha amylase and beta amylase and the amounts of the desired proteases and other enzymes can be easily brought to the values desired by users, within the ranges shown herein.

This application is a continuation of application S.N. 821,766, filed June 22, 1959, and now abandoned.

We claim:

1. The process of malting in which grain is steeped to achieve a 33–37% water content by weight in the grain, and the grain is subsequently treated during germination with a solution of gibberellic acid.

2. The process of malting in which grain is steeped to achieve a 33–37% water content by weight in the grain, and the grain is subsequently treated during germination with a solution of a salt of gibberellic acid.

3. The process of malting in which grain is steeped to achieve a 33–37% water content by weight in the grain, and the grain is subsequently treated during germination with a dilute solution providing 25 micrograms up to 20,000 micrograms of gibberellic acid per pound of grain.

4. The process of malting in which grain is steeped to achieve a 33–37% water content by weight in the grain, and the grain is subsequently treated during germination with a dilute solution providing 25 to 20,000 micrograms of a salt of gibberellic acid per pound of grain.

5. The process of malting in which barley is steeped to achieve a 33–37% water content by weight in the barley, and the barley is subsequently treated during germination with a dilute solution providing 25 micrograms up to 20,000 micrograms of a salt of gibberellic acid per pound of barley.

6. In a process for malting grain for increasing the enzyme content of and the amount of extract obtained from malt, the steps of steeping the grain in water at a temperature and for a time producing 33–37% water content by weight in the grain, couching the grain with eration at a temperature and for a time initiating germination, discharging the grain into a germinating bed of substantially uniform depth, distributing throughout the grain bed a dilute solution providing gibberellic acid in the amount of 25 micrograms up to 20,000 micrograms per pound of grain, maintaining the grain bed throughout at a temperature and for a time to secure a given degree of growth, watering the grain a number of times with substantially equal amounts of water until moisture content thereof is 50–53% by weight, and drying the malt to a water content of 5–6% by weight.

7. The process of claim 6 in which the gibberellic acid solution is in concentration to raise the water content of the grain by approximately 2%.

8. In a process for malting grain for increasing the enzyme content of and the amount of extract obtained from malt, the steps of steeping the grain in water at a temperature of approximately 52° F. and for approximately 10 hours producing 33–37% water content by weight in the grain, couching the grain with aeration at a temperature and for a time initiating germination, discharging the grain into a germination bed of substantially uniform depth, distributing throughout the grain bed a dilute solution providing gibberellic acid in the amount of 25 micrograms up to 20,000 micrograms per pound of grain, maintaining the grain bed throughout at a temperature and for a time to secure a given degree of growth, watering the grain a number of times with substantially equal amounts of water until moisture content thereof is 50–53% by weight, and drying the malt to a water content of 5–6% by weight.

9. In a process for malting grain for increasing the enzyme content of and the amount of extract obtained from malt, the steps of steeping the grain in water at a temperature and for a time producing 33–37% water content by weight in the grain, couching the grain with aeration at a temperature and for a time initiating germination, discharging the grain into a germinating bed of substantially uniform depth, distributing throughout the grain bed a dilute solution providing a salt of gibberellic acid in the amount of from 25 micrograms up to 20,000 micrograms per pound of grain, maintaining the grain bed throughout at a temperature and for a time to secure a given degree of growth, watering the grain a number of times with substantially equal amounts of water until moisture content thereof is 50–53% by weight, and drying the malt to a water content of 5–6% by weight.

10. In a process for malting barley for increasing the enzyme content of and the amount of extract obtained from malt, the steps of steeping the barley in water at a temperature of approximately 52° F. and for approximately 10 hours producing 33–37% water content by weight in the grain, couching the barley with aeration at a temperature and for a time initiating germination, discharging the barley into a germinating bed of substantially uniform depth, distributing throughout the barley bed a dilute solution providing a salt of gibberellic acid in the amount of 25 micrograms up to 20,000 micrograms per pound of barley, maintaining the barley bed throughout at a temperature and for a time to secure a given degree of growth, watering the barley a number of times with substantially equal amounts of water until moisture content thereof is 50–53% by weight, and drying the malt to a water content of 5–6% by weight.

11. The process of claim 10 in which the said gibberellic acid salt solution is concentrated to raise the water content of the grain by approximately 2%.

References Cited in the file of this patent
UNITED STATES PATENTS

| | | |
|---|---|---|
| 2,698,275 | Stoller | Dec. 28, 1954 |
| 2,842,051 | Brian et al. | July 8, 1958 |
| 2,901,401 | Grimm et al. | Aug. 25, 1959 |
| 2,918,413 | Redemann | Dec. 22, 1959 |

OTHER REFERENCES

Munekata et al.: Chem. Abstracts, 1957, vol. 51, 18137i.

Hayashi: Chem. Abstracts, 1940, vol. 35, 772.

Industrial Microbiology, 2nd ed., by Prescott and Dunn, 1949, McGraw-Hill, pages 62 to 66.